INVENTOR.
Earl Schoenfeld
ATTORNEY

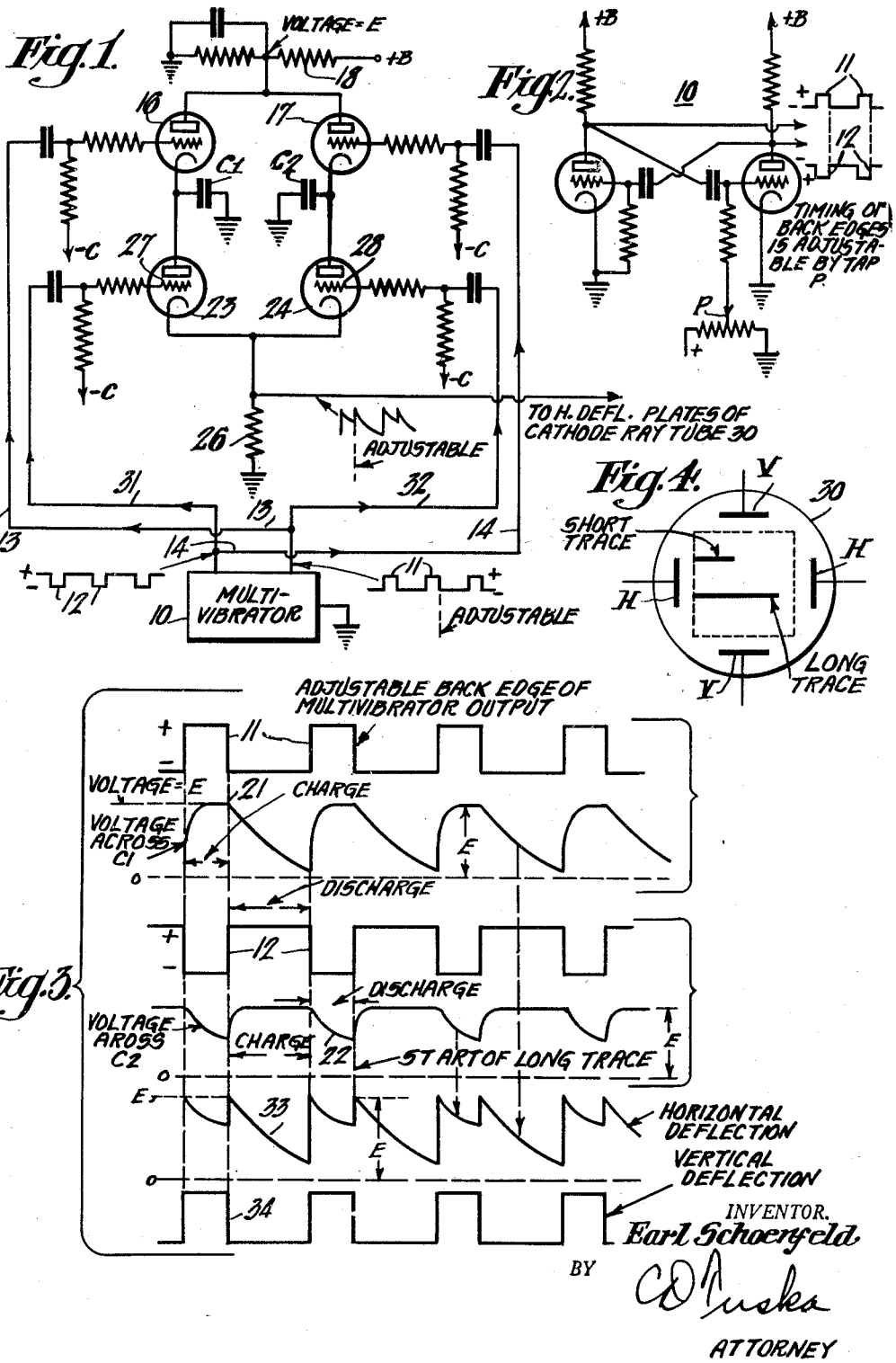

Patented May 6, 1947

2,420,200

UNITED STATES PATENT OFFICE 2,420,200

DEFLECTING CIRCUIT

Earl Schoenfeld, Mamaroneck, N. Y., assignor to Radio Corporation of America, a corporation of Delaware Application July 25, 1944, Serial No. 546,546

5 Claims. (Cl. 320—1)

My invention relates to cathode ray deflecting circuits and particularly to circuits for producing successive cathode ray deflections that are adjustable as to their relative amplitudes and/or starting times.

The invention will be described as designed for use in a navigation system, for example, where the time difference between successively received pulses is to be determined. For this use it is desired that two parallel sweep traces, such as horizontal deflection traces, be obtained which have their left ends, for example, aligned one under the other; and it is also desired that the start of one of the traces be adjustable in time. It may be noted that the two traces will be seen simultaneously because of persistence of vision or lag in the fluorescent screen, or both.

An object of the present invention is to provide an improved means for and method of obtaining a pair of sweep traces of the above described characteristics.

A further object of the invention is to provide an improved deflecting circuit for producing successive deflecting waves of unlike amplitudes.

A still further object of the invention is to provide an improved deflecting circuit for producing successive deflecting waves which are adjustable as to their relative starting times.

In one preferred embodiment of the invention a voltage pulse of adjustable width or duration is produced and applied with opposite polarities to a pair of vacuum tubes controlling the charging of two capacitors, respectively. The pulses are also applied with opposite polarities to a pair of discharge tubes through which the two capacitors, respectively, discharge. The two discharge tubes have a common cathode resistor whereby the two discharge currents produce thereacross a deflecting voltage of the desired wave form.

Figure 5:
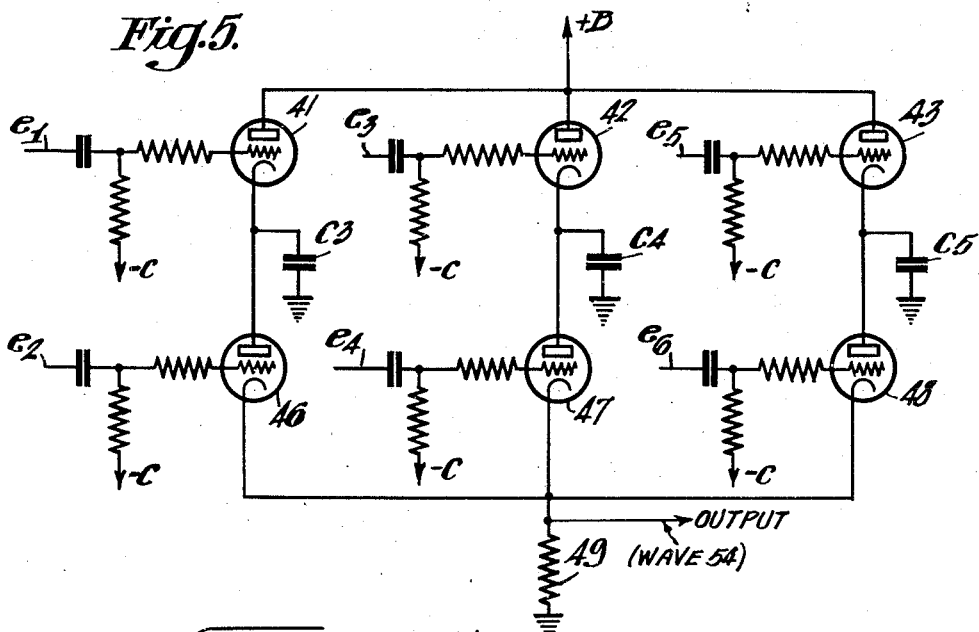
Figure 6:
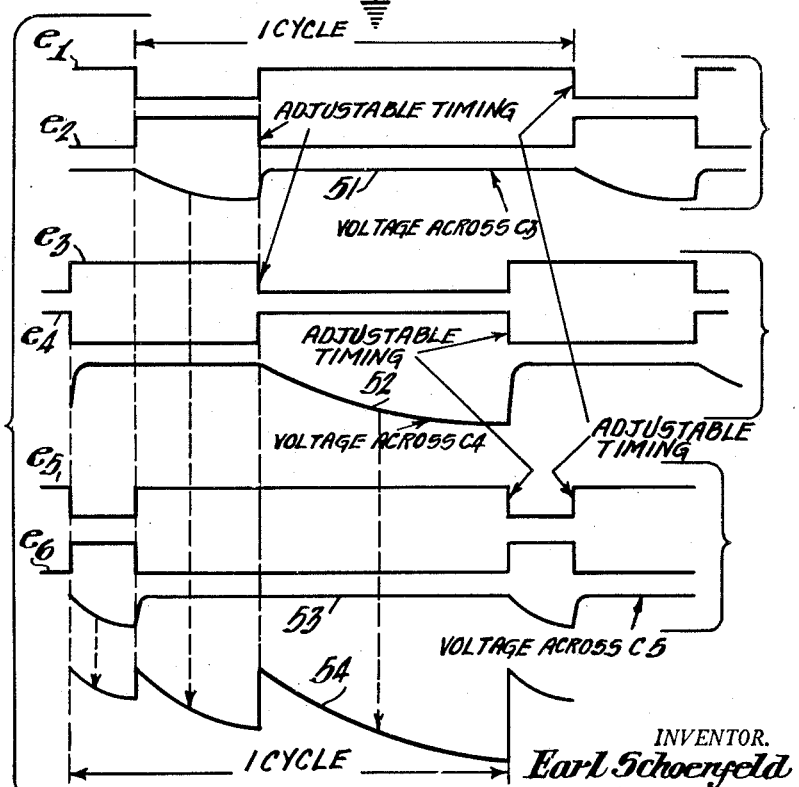

The invention will be better understood from the following description taken in connection with the accompanying drawing in which Figure 1 is a circuit diagram of one preferred embodiment of the invention, Figure 2 is a circuit diagram of a multivibrator that may be employed in the circuit of Fig. 1, Figure 3 is a group of graphs that are referred to in explaining the operation of the circuit of Fig. 1, Figure 4 is a view of the screen end of a cathode ray tube showing the sweep traces produced by the circuit of Fig. 1, Figure 5 is a circuit diagram of another embodiment of the invention, and Figure 6 is a group of graphs that are referred to in explaining the operation of the circuit of Fig. 5.

Referring to Fig. 1, a multivibrator 10 or other suitable pulse generator produces voltage pulses 11 and 12 of opposite polarities and of adjustable width or duration. The pulses 11 and 12 are supplied over conductors 13 and 14, respectively, to the control grids of a pair of vacuum tubes 16 and 17, respectively, whereby these tubes are rendered conducting alternately.

When the tube 16 is conducting, a capacitor C1 is charged through the tube from the +B supply 18 and is charged substantially to the anode voltage E. Likewise, when the tube 17 is conducting, a capacitor C2 is charged also to the voltage E. This charging action is illustrated in Fig. 3 where the graphs 21 and 22 show the voltages appearing across the capacitors C1 and C2, respectively.

Vacuum tubes 23 and 24 are provided for discharging the capacitors C1 and C2, respectively, through a common cathode resistor 26 in response to the application of positive voltages to the control grids 27 and 28. The capacitors C1 and C2 are discharged alternately by applying the pulses 12 and 11 to the grids 27 and 28, respectively, over conductors 31 and 32.

As illustrated in Fig. 1, each of the tubes 16, 17, 27 and 28 may have the pulses applied to the grids through coupling capacitors and grid current limiting resistors. Also, each tube is suitably biased by a biasing or —C voltage applied through the grid leak resistors so that each tube is at plate current cut-off during the time a negative half cycle of a wave 11 or 12 is on its grid.

The discharging action is illustrated in Fig. 3 by the graphs 21 and 22. It will be noted that while the capacitor C1 is charging, the capacitor C2 is discharging. Similarly, while capacitor C2 is charging, the capacitor C1 is discharging. Since the discharge currents of capacitors C1 and C2 flow through the cathode resistor 26, the resulting voltage across resistor 26 is the desired deflecting wave shown by the graph 33.

As indicated by the graphs 21 and 22, the capacitors C1 and C2 reach their full charge very rapidly and are always fully charged to the voltage E before the discharge period begins. Thus, the short and long horizontal sweep traces on the screen of a cathode ray tube 30 start with their ends aligned or positioned one above the other as shown in Fig. 4. Except for the separation of the two sweeps produced by a vertical deflecting wave 34 (Fig. 3), they would start at the same point on the screen. The horizontal and vertical deflecting plates of the cathode ray tube 30 are indicated at H and V, respectively.

Fig. 2 shows, merely by way of example, one type of pulse generator that may be utilized as the generator 10. It is a multivibrator of well known design in which the pulse width is adjusted by changing the positive bias on the grid of one tube. In the circuit illustrated, this is done by means of an adjustable tap P.

From the foregoing description, it will be seen that by adjusting the tap P (thus adjusting the timing of the back edges of the pulses 11) the timing of the start of one of the horizontal sweeps or deflections may be adjusted. This adjustable sweep appears in the illustration as the long sweep. This makes it possible to align two pulses appearing on the two sweeps, respectively, as is required in certain systems for determining the time between successive received pulses.

The invention is not limited to the production of a deflecting wave having only two successive portions of unlike amplitude. For example, Fig. 5 shows a circuit for producing three successive wave portions for producing three sweeps of unequal lengths but starting with the ends of the sweeps in alignment. In this circuit three capacitors C3, C4 and C5 are fully charged successively through vacuum tubes 41, 42 and 43, respectively, and are discharged successively and sequentially through vacuum tubes 46, 47 and 48, respectively, and through the common cathode resistor 49.

The rectangular voltage waves $e_1$, $e_2$, $e_3$, $e_4$, $e_5$ and $e_6$, shown in Fig. 6, are applied to the tubes of Fig. 5 as indicated. The resulting charging and discharging currents for capacitors C3, C4 and C5 are shown by the graphs 51, 52 and 53, respectively, of Fig. 6. The resulting deflecting wave appearing across the cathode resistor 49 is shown by the graph 54.

It will be noted that while one capacitor is discharging, the remaining capacitors cannot discharge because their discharge tubes are being held at plate current cut-off.

From the foregoing it will be apparent that the invention may be employed for obtaining any desired number of cathode ray sweeps of adjustable starting times. The timing of the front and back edges of the rectangular pulses may be varied as indicated in Fig. 6 by means well known in the art for adjusting the starting times of the several cathode ray sweeps.

I claim as my invention:

1. A deflecting wave circuit comprising a plurality of capacitors, means including a plurality of electric discharge tubes connected in series with said capacitors, respectively, for charging them sequentially to substantially full charge and to a predetermined voltage, and means including a plurality of electric discharge tubes for sequentially discharging said capacitors, respectively, each capacitor being discharged during the charging periods of the remaining capacitors, said last tubes having a common cathode resistor through which said capacitors discharge whereby the desired deflecting wave appears thereacross.

2. A deflecting wave circuit comprising two capacitors, means for charging said capacitors alternately to substantially full charge, and means for discharging each of said capacitors to less than complete discharge and with their discharge periods unequal while the other capacitor is being charged whereby they are discharged alternately, said discharging means including a common output impedance through which said capacitors discharge whereby the desired deflecting wave appears thereacross.

3. A deflecting wave circuit comprising two capacitors, means including two electric discharge tubes connected in series with said capacitors, respectively, for charging them alternately to substantially full charge, and means including two electric discharge tubes for discharging said capacitors, respectively, said last two tubes having a common cathode resistor through which said capacitors discharge whereby the desired deflecting wave appears thereacross.

4. In a circuit including at least two capacitors, the method of producing a deflecting wave which comprises producing two similar rectangular waves which are of opposite polarity, each having a positive pulse portion and a negative pulse portion, the positive pulse portion of one rectangular wave and the negative pulse portion of the other rectangular wave being similarly adjustable in width, charging one of said capacitors to substantially full charge in response to the occurrence of each of the positive pulse portions of said one rectangular wave, charging the other of said capacitors in response to the occurrence of each of the positive pulse portions of the other rectangular wave, discharging said one capacitor in response to and during the occurrence of each of the positive pulse portions of said other rectangular wave, and discharging said other capacitor in response to and during the occurrence of each of the positive pulse portions of said one rectangular wave, said capacitors being discharged through a common output circuit.

5. In a circuit including two capacitors, the method of producing a deflecting wave which comprises producing two similar rectangular waves which are of opposite polarity, each having a positive pulse portion and a negative pulse portion, the positive pulse portion of one rectangular wave and the negative pulse portion of the other rectangular wave being similarly adjustable in width, charging one of said capacitors to substantially full charge in response to the occurrence of each of the positive pulse portions of said one rectangular wave, discharging said capacitor in response to and during the positive pulse portion of the other rectangular wave, charging the other of said capacitors to substantially full charge in response to the occurrence of each of the positive pulse portions of said other rectangular wave, and discharging said other capacitor in response to and during the positive pulse portion of said one rectangular wave, said capacitors being discharged through a common output circuit.

EARL SCHOENFELD.

REFERENCES CITED

The following references are of record in the file of this patent:

UNITED STATES PATENTS

| Number | Name | Date |
|---|---|---|
| 2,235,385 | Rava | Mar. 18, 1941 |
| 2,341,562 | Klemperer | Feb. 15, 1944 |

FOREIGN PATENTS

| Number | Country | Date |
|---|---|---|
| 519,353 | British | Mar. 21, 1940 |